US011836538B2

(12) United States Patent
Tamilselvam et al.

(10) Patent No.: US 11,836,538 B2
(45) Date of Patent: Dec. 5, 2023

(54) HETEROGENEOUS GRAPH GENERATION FOR APPLICATION MICROSERVICES

(71) Applicant: International Business Machines Corporation, Armonk, NY (US)

(72) Inventors: Srikanth Govindaraj Tamilselvam, Chennai (IN); Utkarsh Milind Desai, Bangalore (IN); Sambaran Bandyopadhyay, Hooghly (IN); Alex Mathai, Mumbai (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 135 days.

(21) Appl. No.: 17/498,406

(22) Filed: Oct. 11, 2021

(65) Prior Publication Data

US 2023/0111379 A1 Apr. 13, 2023

(51) Int. Cl.
*G06F 9/54* (2006.01)
*G06F 16/28* (2019.01)
(Continued)

(52) U.S. Cl.
CPC ............ *G06F 9/541* (2013.01); *G06F 16/285* (2019.01); *G06F 16/9024* (2019.01); *G06N 3/02* (2013.01)

(58) Field of Classification Search
None
See application file for complete search history.

(56) References Cited

U.S. PATENT DOCUMENTS 10,827,020 B1 * 11/2020 Cao .................. H04L 67/561
2020/0279151 A1 * 9/2020 Li ..................... G06F 17/18
(Continued)

FOREIGN PATENT DOCUMENTS

WO WO2018197928 A1 11/2018

OTHER PUBLICATIONS

Author Unknown, "Diluting Outliers for Refactoring Monolith Application through Attributed Graph Embeddings", IP.com, IPCOM000263520D, Sep. 7, 2020, 6 pages, IP.com.
(Continued)

*Primary Examiner* — Umut Onat
(74) *Attorney, Agent, or Firm* — Ference & Associates LLC (57) ABSTRACT

One embodiment provides a method, including: receiving information describing an application to be split into a plurality of microservices; identifying, utilizing a microservices advisor application, application elements of the application; generating, utilizing the microservices advisor application and from the application elements, a heterogenous graph, wherein each node within the heterogenous graph represents an application element and wherein each edge within the heterogenous graph represents a relationship between two nodes connected by the edge; identifying, based upon user input identifying preferences of relationships between nodes, groups of nodes within the heterogenous graph sharing a common attribute; and providing, from the microservices advisor application, a recommendation, based upon the identified groups of nodes, for splitting the application into microservices, wherein the recommendation includes a number of microservices for the application and application elements that should be included within each of the microservices.

18 Claims, 4 Drawing Sheets

(51) Int. Cl.
  *G06F 16/901*    (2019.01)
  *G06N 3/02*      (2006.01)

(56) References Cited

U.S. PATENT DOCUMENTS

| | | | |
|---|---|---|---|
| 2021/0232390 A1* | 7/2021 | Hwang | H04L 41/16 |
| 2021/0390405 A1* | 12/2021 | Choi | G06N 3/045 |
| 2022/0309334 A1* | 9/2022 | Rossi | G06N 3/08 |

OTHER PUBLICATIONS

Manabu Kamimura et al., "Extracting Candidates of Microservices from Monolithic Application Code", 2018 25th Asia-Pacific Software Engineering Conference (APSEC), Dec. 7, 2018, vol. 1, 10 Pages, IEEE Digital Library.

Author Unknown, "Method for Decomposing Monolithic Applications into Candidate Microservices Proposals, Complexity Metrics, and Effort Estimates", IP.Com, IPCOM000258428D, May 10, 2019, 4 pages, IP.com.

Kenny Bastani, "Using Graph Analysis to Decompose Monoliths into Microservices with Neo4j", May 14, 2015, 11 Pages, Blog Post.

Holger Harms et al., "Guidelines for Adopting Frontend Architectures and Patterns in Microservices-Based Systems", ESEC/FSE '17, Sep. 4-8, 2017, Paderborn, Germany, 6 pages, ACM Digital Library.

Mohammad Javad Amiri, "Object-aware Identification of Microservices", Computer Science, 2018 IEEE International Conference on Services Computing (SCC), Jul. 2-7, 2018, San Francisco, CA, USA, 7 pages, IEEE Digital Library.

Zhongshan Ren et al., "Migrating Web Applications from Monolithic Structure to Microservices Architecture", Internetware '18, Sep. 16, 2018, Beijing, China, 10 pages, ACM Digital Library.

Wuxia Jin et al., "Functionality-oriented Microservice Extraction Based on Execution Trace Clustering", 2018 IEEE International Conference on Web Services (ICWS), 2018, 8 Pages, IEEE Digital Library.

Luis Nunes et al., "From a Monolith to a Microservices Architecture: An Approach Based on Transactional Contexts", European Conference on Software Architecture, ECSA 2019, 23 Pages, SpringerLink.

Luciano Baresi et al., "Microservices Identification Through Interface Analysis", European Conference on Service-Oriented and Cloud Computing, Sep. 2017, 16 Pages, ResearchGate.

Jonas Fritzsch et al., "From Monolith to Microservices: A Classification of Refactoring Approaches", First International Workshop, DEVOPS 2018, Chateau de Villebrumier, France, Mar. 5-6, 2018, 14 Pages, ResearchGate.

* cited by examiner

HETEROGENEOUS GRAPH GENERATION FOR APPLICATION MICROSERVICES

BACKGROUND

With the increase in remote computing or services environments, for example, remote network environments, cloud computing environments, and the like, more users and entities are moving the hosting of applications and other services to a remote services environment. By moving the hosting of applications and other services to the remote services environment, the users and other entities are able to reduce the use of internal resources (e.g., infrastructure, computing resources, human resources, etc.) and reduce other costs associated with the application and other services. Additionally, since the remote services environment usually has significantly more resources, particularly, computing resources, than the user or entity has locally, the user or entity is able to more easily scale the application that is being hosted on the remote services environment.

BRIEF SUMMARY

In summary, one aspect of the invention provides a method, including: receiving information describing an application to be split into a plurality of microservices; identifying, utilizing a microservices advisor application, application elements of the application; generating, utilizing the microservices advisor application and from the application elements, a heterogenous graph, wherein each node within the heterogenous graph represents an application element and wherein each edge within the heterogenous graph represents a relationship between two nodes connected by the edge; identifying, utilizing the microservices advisor application and utilizing a graph clustering technique and based upon the edges within the heterogenous graph, groups of nodes within the heterogenous graph sharing a common attribute, which may be an identification by a user of an importance of relationships between nodes; and providing, from the microservices advisor application, a recommendation, based upon the identified groups of nodes, for splitting the application into microservices, wherein the recommendation includes a number of microservices for the application and application elements that should be included within each of the microservices.

Another aspect of the invention provides an apparatus, including: at least one processor; and a computer readable storage medium having computer readable program code embodied therewith and executable by the at least one processor; wherein the computer readable program code is configured to receive information describing an application to be split into a plurality of microservices; wherein the computer readable program code is configured to identify, utilizing a microservices advisor application, application elements of the application; wherein the computer readable program code is configured to generate, utilizing the microservices advisor application and from the application elements, a heterogenous graph, wherein each node within the heterogenous graph represents an application element and wherein each edge within the heterogenous graph represents a relationship between two nodes connected by the edge; wherein the computer readable program code is configured to identify, utilizing the microservices advisor application and utilizing a graph clustering technique and based upon the edges within the heterogenous graph, groups of nodes within the heterogenous graph sharing a common attribute, which may be an identification by a user of an importance of relationships between nodes; and wherein the computer readable program code is configured to provide, from the microservices advisor application, a recommendation, based upon the identified groups of nodes, for splitting the application into microservices, wherein the recommendation includes a number of microservices for the application and application elements that should be included within each of the microservices.

An additional aspect of the invention provides a computer program product, including: a computer readable storage medium having computer readable program code embodied therewith, the computer readable program code executable by a processor; wherein the computer readable program code is configured to receive information describing an application to be split into a plurality of microservices; wherein the computer readable program code is configured to identify, utilizing a microservices advisor application, application elements of the application; wherein the computer readable program code is configured to generate, utilizing the microservices advisor application and from the application elements, a heterogenous graph, wherein each node within the heterogenous graph represents an application element and wherein each edge within the heterogenous graph represents a relationship between two nodes connected by the edge; wherein the computer readable program code is configured to identify, utilizing the microservices advisor application and utilizing a graph clustering technique and based upon the edges within the heterogenous graph, groups of nodes within the heterogenous graph sharing a common attribute, which may be an identification by a user of an importance of relationships between nodes; and wherein the computer readable program code is configured to provide, from the microservices advisor application, a recommendation, based upon the identified groups of nodes, for splitting the application into microservices, wherein the recommendation includes a number of microservices for the application and application elements that should be included within each of the microservices.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

One problem with moving applications to a remote services environment for hosting is that it is difficult if not impossible to move an entire application to the remote services environment. Specifically, it is easier to move smaller portions of an application, referred to as microservices, to the remote services environment, thereby allowing different portions to be hosted on different portions of the remote services environment. This may be beneficial for the best use of resources of the remote services environment. Additionally, the remote services environment is better equipped to run smaller portions of an application. Thus, a single application needs to be broken or split into smaller modules, portions, or microservices in order to be moved to and effectively hosted by the remote services environment.

Another benefit to splitting an application into multiple microservices, even if not hosted or moved to a remote services environment, is that a large single application is harder to manage and harder to scale than a plurality of smaller microservices. Additionally, problems can arise with typical functions using a single application. For example, if only a portion of the application needs to be updated, the entire application has to be updated when the application is a single large application as opposed to just updating a single or a few microservices if the application has been split into microservices.

The difficult thing about splitting an application into microservices is that there are many different techniques for splitting an application. For example, one user may choose to split an application based upon most used services, whereas another user may choose to split the same application based upon resource usage by services. Another technique for splitting applications is based upon the function of portions of the application. Different techniques for splitting the application result in contrasting partitions between the techniques, or overlapping partitions. Thus, choosing how to split the application is very dependent on the user and the chosen technique may not end up being the best technique for moving the application to the remote services application.

Accordingly, an embodiment provides a system and method for providing a recommendation for splitting an application into microservices utilizing a microservices advisor application that generates a heterogenous graph of application elements and then identifies groups or communities of application elements with the heterogenous graph. The described system and method are able to identify chunks or microservices from a larger application, referred to as a monolith application, how many microservices should be created, and what functions or application elements should be included in each microservice split. Additionally, the described system and method provides a justification for a particular microservice split recommendation.

The system employs a microservices advisor application that is able to make recommendations for application splitting utilizing information describing the application to be split into the microservices. The microservices advisor application identifies application elements of the target application. Application elements may include files, objects, tables, holding objects, classes, applications, and any other elements or artifacts that make up or are used within the application. From the application elements the microservices advisor application generates a heterogenous graph where nodes represent application elements and edges represent relationships between nodes connected by the edges. Generation of the graph includes identifying direct and indirect associations between application elements. The graph is a heterogenous graph because it is able to identify application elements and relationships between application elements from more than just programs, for example, the system can identify elements and relationships from objects, tables, transactions, in addition to the programs.

Using the edges identified in the graph, the microservices advisor application is able to identify groups of nodes sharing a common attribute. The common attribute may be a common preference, common domain, common technology, or the like. In identifying the groups, the advisor application may use a graph clustering technique. Additionally, in identifying the groups, the system may take into account any user constraints or preferences with respect to application elements that should be grouped. For example, a user may identify that particular application elements should be grouped together. Thus, the advisor application would make sure to group these elements together when clustering. Once the groups of nodes are identified, referred to as communities, the system provides a recommendation to a user for splitting the application into microservices. The recommendation not only identifies the microservices, but also identifies the number of microservices and the application elements that should be included within each of the microservices.

Such a system provides a technical improvement over current systems for splitting applications into microservices. Instead of relying on a user for determining how an application should be split, the described system and method is able to automatically identify how the application should be split into microservices and make a recommendation of the same to a user. Such automatic identification and recommendation generation is not found in the current technology. In determining the splits, the system generates and utilizes a heterogenous graph that is able to identify direct and indirect associations between application elements, affinity between application elements, heterogenous features beyond programs and program-to-program dependencies, and also takes into account any user-provided information regarding importance or other information related to relationships between application elements. Such techniques are not utilized in current application splitting techniques. Thus, the described system provides a more efficient and consistent technique for application splitting than what is found in conventional systems and methods that rely on a user to manually determine how an application should be split.

Figure 1:
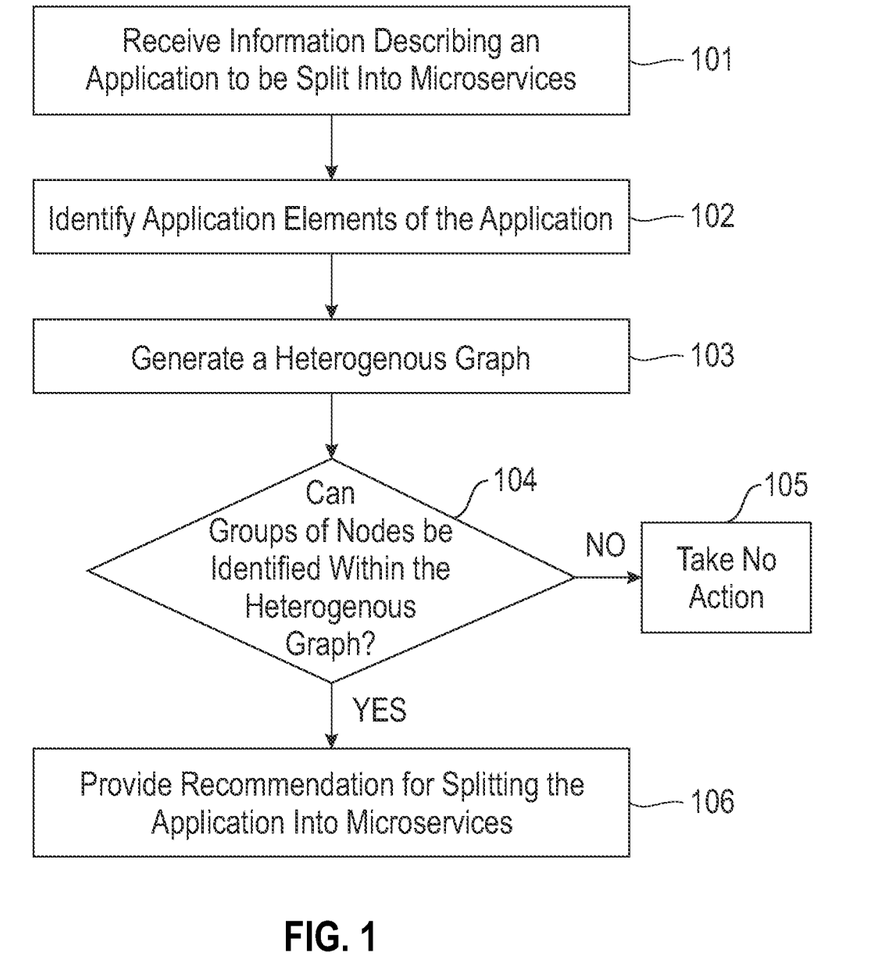
FIG. 1 illustrates a method of providing a recommendation for splitting an application into microservices utilizing a microservices advisor application that generates a heterogenous graph of application elements and then identifies groups or communities of application elements with the heterogenous graph.

FIG. 1 illustrates a method for providing a recommendation for splitting an application into microservices utilizing a microservices advisor application that generates a heterogenous graph of application elements and then identifies groups or communities of application elements with the heterogenous graph. At 101, the system receives information describing an application to be split into a plurality of microservices. The application may be a monolith application, meaning it is a single-tiered software application in which the user interface and data access code are combined into a single program from a single platform. In other words, the application can run independently and does not need to access other services or microservices to perform the intended function(s). The application is an application that a user wants to split into different microservices. For example, a user may want to host the application on a remote services environment, thereby needing the application to be split into smaller chunks or microservices. As another example, the user may simply want to split the application to make it easier to scale, manage, or the like. In other words, the user wants to convert the application from a monolith application into a microservices application.

At 102, a microservices advisor application identifies application elements of the application. The microservices advisor application is an application that is specially programmed to take the application information and generate application splitting recommendations. The microservices advisor application may include a graphical user interface that allows a user to provide input into the application. The microservices application may include interfaces or special programming that allow the application to interface with other programs, databases, data storage locations, applications, or the like, in order to capture information, perform analysis, generate the heterogenous graph, and provide output to a user.

The application elements may include classes, objects, resources, files, holding objects, tables, programs, transactions, and any other elements that are part of the application, accessed by the application, or otherwise connected to the application. In order to identify application elements, the advisor application may receive information related to the application that identify the application and illustrates how the application functions, for example, how different portions of the application interact with other portions, how the application runs, and the like. For example, the information may be input artefacts that may include a source file of the application, code corresponding to the application, a binary source file, or the like. From the received information, the system may parse the received information and perform an analysis to infer some additional information of the application. The analysis may also be performed without first parsing the received information. One or more analyses may be performed and may include a runtime analysis, data analysis, static code analysis, dependency analysis, logs analysis, program analysis, or the like.

Any analysis performed assists the system in trying to understand the received information and the application and, therefore, elements of the application. For example, the system may parse the source code and identify access points, code portions that perform a particular function, a number of classes within the code, operations that are performed, the resources (e.g., tables, files, etc.) used by the application, etc.), code dependencies, and the like. As another example, the system can analyze runtime logs to identify the frequency of application services called, a call graph of the application service, and the like. The system may also identify or infer other information regarding the application, for example, the programming language that was used to program the application, runtimes, resource usage and allocations, and the like. The received information and the additional information can be used to identify information about the application in order to identify how the application could be split into different microservices.

A single application can include many different modules or portions that each perform a different function. As an example, an e-commerce application may include a customer service portion, a product inventory portion, a transaction portion, and the like. Each of these portions may include its own application elements. Additionally, some application elements from one portion may access, communicate with, or call application elements from another portion. For example, one portion may access a table or holding object contained within another portion. A holding object is the code that represents a real-world object. Using the e-commerce example, the real-world object may be a particular customer and the holding object is the program code that represents that particular customer.

At 103, the microservices advisor application generates a heterogenous graph that includes nodes and edges. Nodes with the graph represent or correspond to application elements. Edges within the graph represent relationships between application elements connected by an edge. The heterogenous graph includes all of the application elements of the application itself and also includes any elements that are outside the application but are accessed by, provide information into, or otherwise communicate with or call between the application. These are all represented by nodes within the heterogenous graph.

Generating the heterogenous graph may include utilizing a neural network that is able to identify relationships between application elements. As the neural network is utilized in the generation of heterogenous graphs, the neural network learns more about different application elements and what constitutes relationships between application elements. Accordingly, the neural network allows the microservices advisor application to become more refined and accurate over time regarding what is considered an application element and what constitutes a relationship and the type of relationship between application elements.

From the analysis of the application and/or using the neural network, the microservices advisor application is able to identify relationships or associations between the application elements. The relationships or associations are identified when any of the application elements communicate between or call each other. These communications may be across application portions, from the application to an element outside the application, or within a particular application portion. The ability of the microservices advisor application to identify relationships or associations between many different application elements and not just between programs allows the advisor application to generate the heterogenous graph.

Additionally, relationships or associations may be direct relationships/associations or indirect relationships/associations. Application elements having direct relationships/associations are identified as those application elements that communicate directly with each other, for example, if a program application element calls a table application element. Thus, identifying direct associations includes identifying application elements that communicate between each other. Application elements having indirect relationships/associations are identified as those application that communicate with a common application element but that do not necessarily communicate with each other. For example, two application elements both communicating with the same holding object application element would have an indirect relationship. In other words, an indirect association may be identified when a single application element is being accessed by more than one other application element. Those application elements that are accessing the single application element would have an indirect association. It should be noted that the same application elements may have both a direct and an indirect relationship with each other. For example, the application elements may communicate directly with each other and both may also communicate with a common other application element.

Figure 2A:
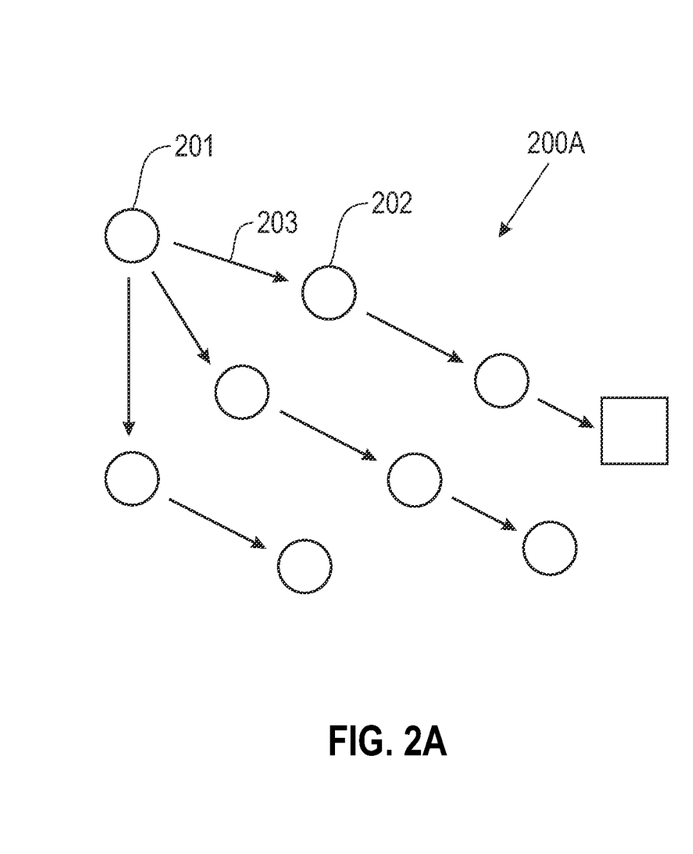
FIG. 2A illustrates an example of direct associations between application elements.

FIG. 2A illustrates a direct relationship between application elements in a graph format 200A. Application element 201 communicates directly with application element 202. Both of these application elements 201 and 202 are represented by nodes within the graph 200A. Since these application elements 201 and 202 communicate between each other an edge 203 connects the two application elements 201 and 202 indicating a direct association between the application elements 201 and 202.

Figure 2B:
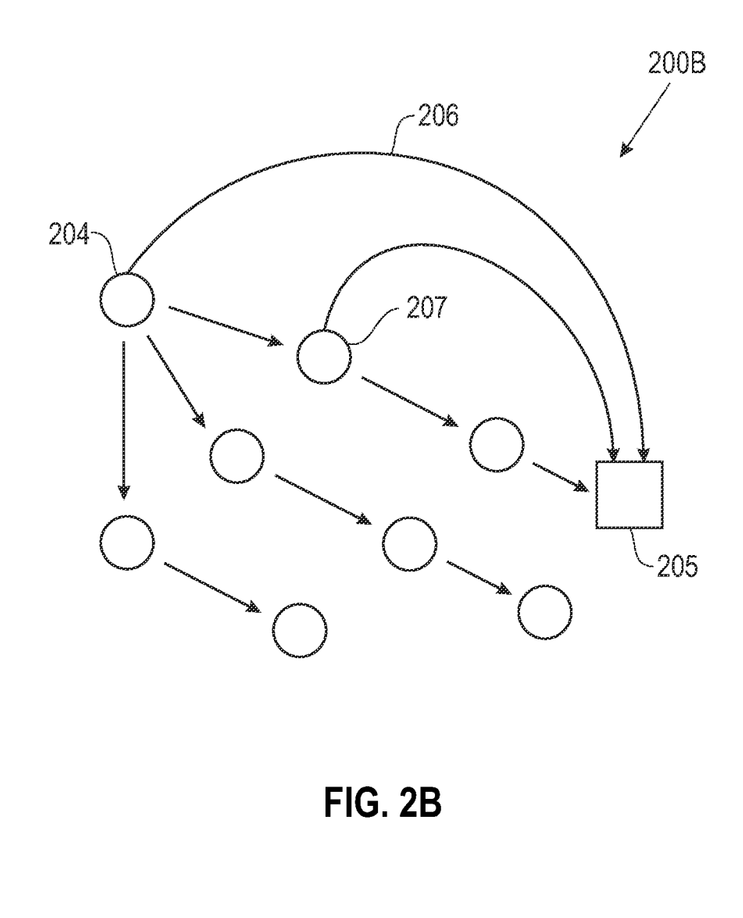
FIG. 2B illustrates an example of indirect associations between application elements.

FIG. 2B illustrates an indirect relationship between application elements in a graph format 200B. Application element 204 is represented by a node. Additionally, application element 207 is represented by a node. Both of these application elements 204 and 207 communicate with application element 205 represented by a node. The communication of these application elements 204 and 207 to application element 205 are represented by edges 206. Since both application element 204 and 207 communicate with a common application element 205, application elements 204 and 207 are identified as having an indirect relationship to each other.

At 104, the microservices advisor application determines whether groups of nodes can be identified within the heterogenous graph. The groups of nodes may be referred to as communities or clusters of nodes. To perform the grouping, the advisor application may use a graph clustering technique, for example, an unsupervised clustering algorithm. Generally, an unsupervised clustering algorithm works to group similar nodes together into a single cluster. Thus, to identify groups of nodes within the heterogenous graph, the microservices advisor application identifies nodes sharing a common attribute, for example, common preferences, common domain, common technology, or the like. The common attribute may be identified from different application artifacts. For example, the common attribute may be identified based upon the direct and/or indirect associations identified when generating the graph. Thus, identifying groups of nodes may be performed in view of the direct and/or indirect associations of application elements as identified based upon the edges within the graph.

The attributes may be determined using other factors. For example, the advisor application may identify class affinities (CA) between application elements. Affinities identify whether classes within an application function have some connection to or relationship with other classes within other application functions, even if they may not directly communicate with each other. The class affinities may be used in identifying the attributes. Other factors may include inter-class usage (ICU), path class-cooccurrence (PCC), transactions (TR), and the like. These factors may indicate some connection between application elements and also identify a strength of the relationship between application elements, which can be used in identifying the attribute.

In performing the clustering, the advisor application may take into account user-provided constraints or requirements. For example, a user may indicate particular resource usage requirements, runtime requirements, maximum class or object requirements, maximum module sizes, and the like. As another example, the user may indicate application elements that should be grouped or should never be grouped. As a final example, the user may identify that a particular set of application elements that implement a particular interface can be split, but a program that does an update for a table should never be split.

The user may also identify an importance of particular relationships between application elements when identifying the communities. For example, the user may identify those particular nodes or relationships between nodes are important to keep together in a single cluster or, alternatively, are important to keep in separate clusters. The user may also identify a weighted importance. For example, the user may identify that one relationship within the graph is more or less important than another relationship within the graph. Thus, the microservices advisor application can utilize an attention mechanism to capture the importance of relationships within the graph neural network and cluster the nodes in the graph based, at least in part, on the identified importance. Using the provided requirements or constraints the system is able to cluster the nodes into clusters that meet or fulfill the desired requirements or constraints. Thus, the advisor application can utilize factors, user-provided input, and the like, in performing the clustering. The clustering may also be performed using a machine-learning model or neural network that continually learns from previous clustering.

If clusters cannot be identified at 104, the advisor application may take no action at 105. The advisor application may also notify the user that clusters cannot be identified. On the other hand, if clusters can be identified at 104, the advisor application may provide a recommendation for splitting the application into microservices at 105. In providing the recommendation the system may provide a first pass recommendation to the user allowing the user to make any modifications to the clusters. Thus, the user is provided an opportunity to validate the communities or clusters and identify any outliers. This input can then be incorporated into the clusters and the clusters refined by the advisor application. The final microservice clusters can then be generated and used or provided within the recommendation provided to the user.

The recommendation may identify how many microservices the application should be split into. In other words, the recommendation identifies a number of microservices for the application. Additionally, the recommendation identifies the application elements that should be included within each of the microservices within the recommendation. The recommendation is based upon the clustering and the factors used within the clustering. Thus, the recommendation is based upon the user provided information, constraints, and/or requirements. The advisor application may also provide justification for the recommendation. The justification may include identifying which factors were used in or had higher influence on the microservice clustering recommendation. The justification allows the user to easily identify any changes that should be made to the clustering algorithms or factors used in the clustering.

Figure 3:
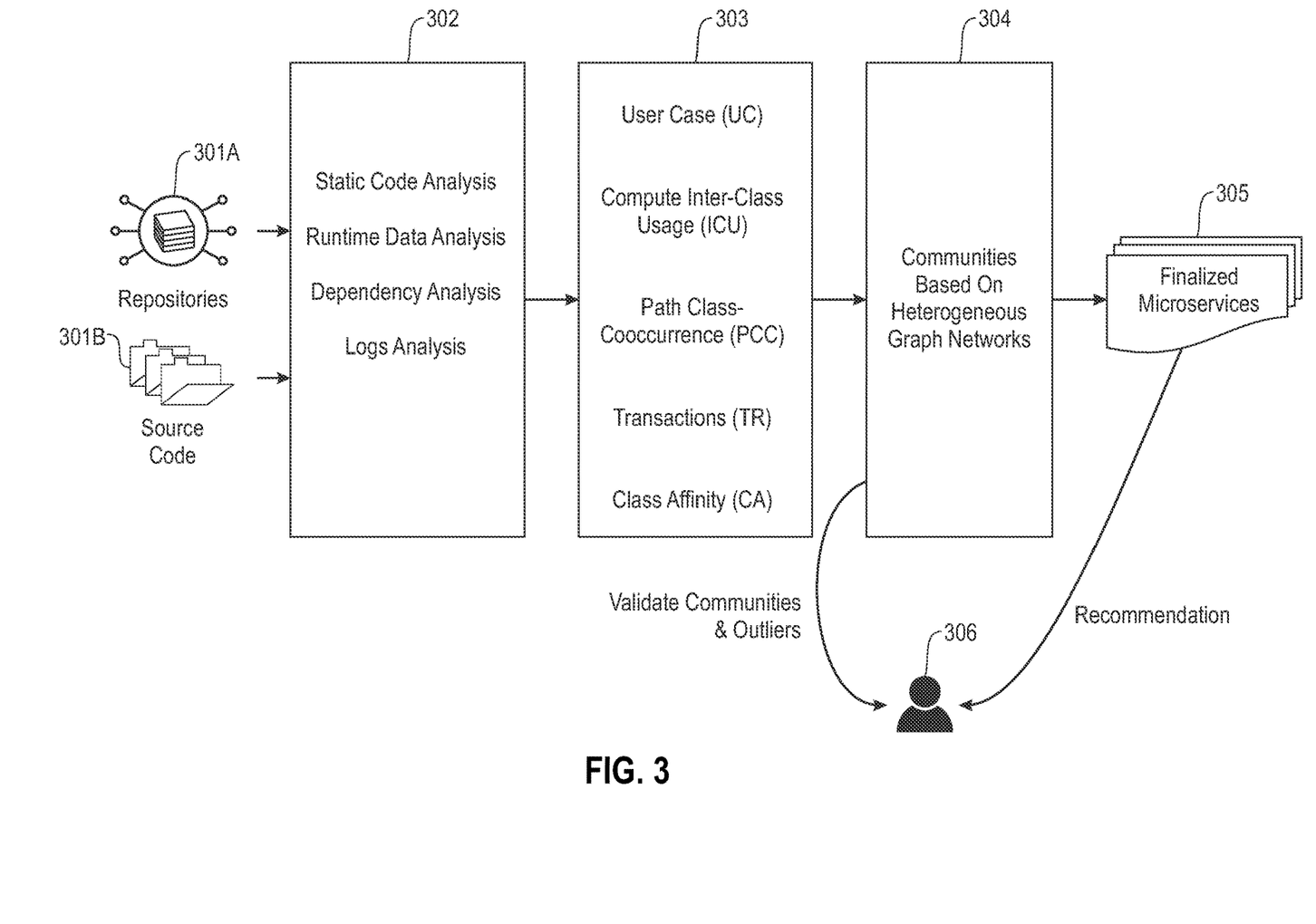
FIG. 3 illustrates an example overall system architecture for providing a recommendation for splitting an application into microservices utilizing a microservices advisor application that generates a heterogenous graph of application elements and then identifies groups or communities of application elements with the heterogenous graph.

FIG. 3 illustrates an overall system for the microservices advisor application. The advisor application obtains information describing an application to be split into microservices. The information may be obtained from data repositories 301A, source code 301B corresponding to the application, or the like. The advisor application performs analyses 302, for example, static code analysis, runtime data analysis, data analysis, dependency analysis, logs analysis, program analysis, or the like. From the analyses the advisor application generates a heterogenous graph having nodes representing application elements and edges representing relationships between the application elements. Once the graph is generated, the advisor application clusters groups of nodes into communities based upon different factors 303, for example, user cases, inter-class usage, path class-cooccurrence, transactions, class affinities, and the like. The result is groups of nodes, referred to as communities, that are based on the heterogenous graph networks 304. These communities may be sent to a user 306 for validation and for the user to identify any outliers. Any user input is incorporated and the finalized microservices 305 are output to a user 306 as a recommendation for splitting the application into microservices.

Figure 4:
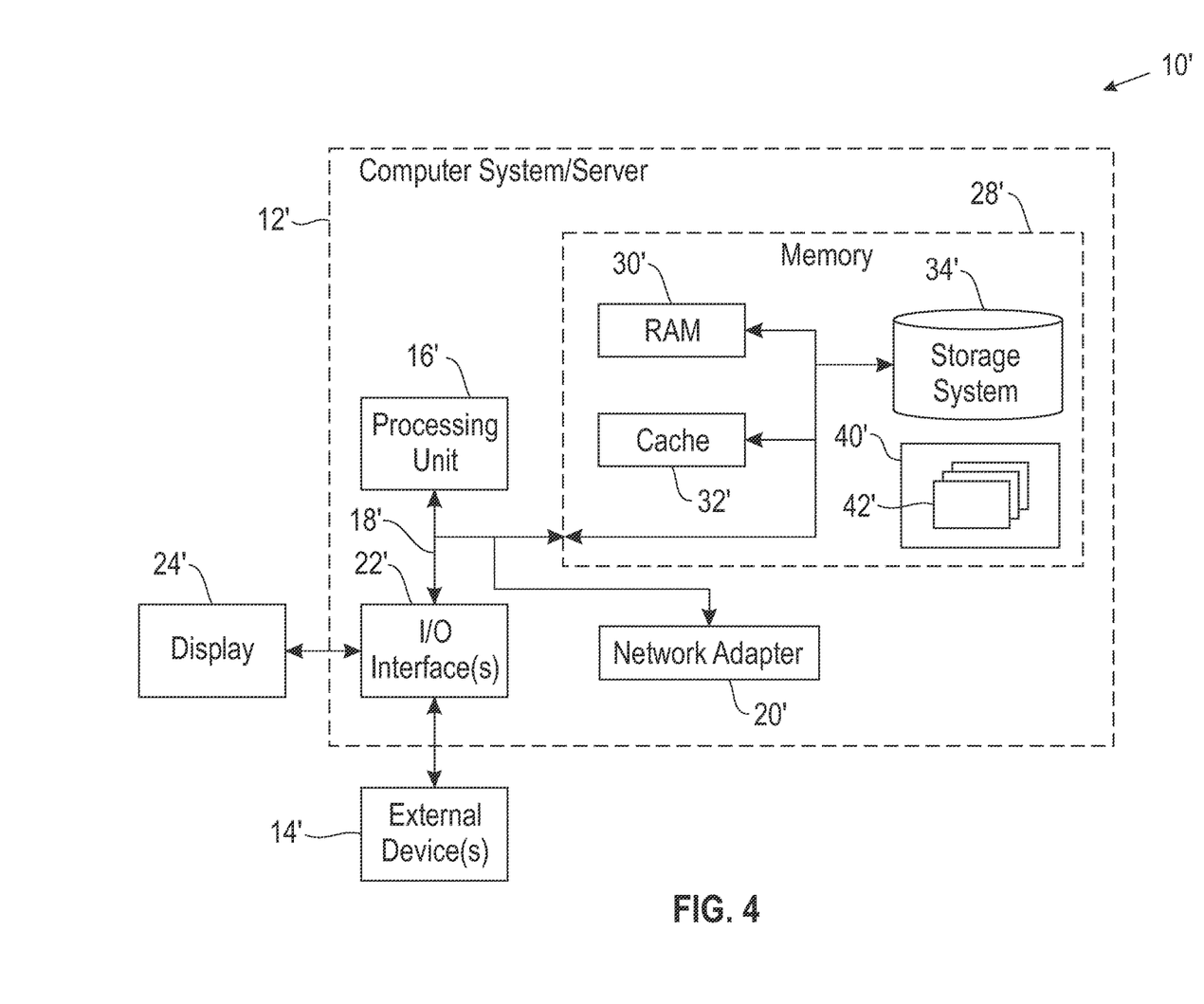
FIG. 4 illustrates a computer system.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
receiving information describing an application to be split into a plurality of microservices;
identifying, utilizing a microservices advisor application, application elements of the application;
generating, utilizing the microservices advisor application and from the application elements, a heterogenous graph, wherein the generating comprises identifying, using a neural network that is refined over time based upon historical generation of heterogenous graphs, relationships between application elements and a type of the relationships between the application elements, wherein each node within the heterogenous graph represents an application element and wherein each edge within the heterogenous graph represents a relationship, as identified at least in part using the neural network, between two nodes connected by the edge, wherein the application elements comprise direct elements of the application and indirect elements that are outside the application and call between the application;
identifying, utilizing the microservices advisor application and utilizing a graph clustering technique and based upon the edges within the heterogenous graph, groups of nodes within the heterogenous graph sharing a common attribute; and
providing, from the microservices advisor application, a recommendation, based upon the identified groups of nodes, for splitting the application into microservices, wherein the recommendation comprises a number of microservices for the application and application elements that should be included within each of the microservices.

2. The method of claim 1, wherein the identifying groups of nodes is performed in view of user-provided constraints.

3. The method of claim 1, wherein the generating comprises identifying indirect associations between the application elements and wherein the identifying groups of nodes is performed in view of the indirect associations.

4. The method of claim 3, wherein the identifying indirect associations comprises identifying application elements that are accessed by more than one other application element.

5. The method of claim 1, wherein the generating comprises identifying direct associations between the application elements and wherein the identifying groups of nodes is performed in view of the direct associations.

6. The method of claim 5, wherein the identifying direct associations comprises identifying application elements that communicate between each other.

7. The method of claim 1, wherein the identifying groups of nodes is performed in view of affinities between the application elements.

8. The method of claim 1, wherein the providing comprises providing justification for the recommendation.

9. The method of claim 1, wherein the application elements comprise elements selected from the group consisting of: classes, objects, resources, and files.

10. An apparatus, comprising:
at least one processor; and
a computer readable storage medium having computer readable program code embodied therewith and executable by the at least one processor;
wherein the computer readable program code is configured to receive information describing an application to be split into a plurality of microservices;
wherein the computer readable program code is configured to identify, utilizing a microservices advisor application, application elements of the application;
wherein the computer readable program code is configured to generate, utilizing the microservices advisor application and from the application elements, a heterogenous graph, wherein the generating comprises identifying, using a neural network that is refined over time based upon historical generation of heterogenous graphs, relationships between application elements and a type of the relationships between the application elements, wherein each node within the heterogenous graph represents an application element and wherein each edge within the heterogenous graph represents a relationship, as identified at least in part using the neural network, between two nodes connected by the edge, wherein the application elements comprise direct elements of the application and indirect elements that are outside the application and call between the application;
wherein the computer readable program code is configured to identify, utilizing the microservices advisor application and utilizing a graph clustering technique and based upon the edges within the heterogenous graph, groups of nodes within the heterogenous graph sharing a common attribute; and
wherein the computer readable program code is configured to provide, from the microservices advisor application, a recommendation, based upon the identified groups of nodes, for splitting the application into microservices, wherein the recommendation comprises a number of microservices for the application and application elements that should be included within each of the microservices.

11. A computer program product, comprising:
a computer readable storage medium having computer readable program code embodied therewith, the computer readable program code executable by a processor;
wherein the computer readable program code is configured to receive information describing an application to be split into a plurality of microservices;
wherein the computer readable program code is configured to identify, utilizing a microservices advisor application, application elements of the application;
wherein the computer readable program code is configured to generate, utilizing the microservices advisor application and from the application elements, a heterogenous graph, wherein the generating comprises identifying, using a neural network that is refined over time based upon historical generation of heterogenous graphs, relationships between application elements and a type of the relationships between the application elements, wherein each node within the heterogenous graph represents an application element and wherein each edge within the heterogenous graph represents a relationship, as identified at least in part using the neural network, between two nodes connected by the edge, wherein the application elements comprise direct elements of the application and indirect elements that are outside the application and call between the application;

wherein the computer readable program code is configured to identify, utilizing the microservices advisor application and utilizing a graph clustering technique and based upon the edges within the heterogenous graph, groups of nodes within the heterogenous graph sharing a common attribute; and wherein the computer readable program code is configured to provide, from the microservices advisor application, a recommendation, based upon the identified groups of nodes, for splitting the application into microservices, wherein the recommendation comprises a number of microservices for the application and application elements that should be included within each of the microservices.

12. The computer program product of claim 11, wherein the identifying groups of nodes is performed in view of user-provided constraints.

13. The computer program product of claim 11, wherein the generating comprises identifying indirect associations between the application elements and wherein the identifying groups of nodes is performed in view of the indirect associations.

14. The computer program product of claim 13, wherein the identifying indirect associations comprises identifying application elements that are accessed by more than one other application element.

15. The computer program product of claim 11, wherein the generating comprises identifying direct associations between the application elements and wherein the identifying groups of nodes is performed in view of the direct associations.

16. The computer program product of claim 15, wherein the identifying direct associations comprises identifying application elements that communicate between each other.

17. The computer program product of claim 11, wherein the identifying groups of nodes is performed in view of affinities between the application elements.

18. The computer program product of claim 11, wherein the providing comprises providing justification for the recommendation.

* * * * *